United States Patent [19]
West

[11] 3,812,863
[45] May 28, 1974

[54] CROP ORIENTING MECHANISM

[76] Inventor: Frederick P. West, Rt. No. 1, Terrell, Ga. 31742

[22] Filed: Apr. 9, 1973

[21] Appl. No.: 348,927

[52] U.S. Cl............................................. 130/30 C
[51] Int. Cl..................................................... A01d
[58] Field of Search ............... 130/30 R, 30 B, 30 C

[56] References Cited
UNITED STATES PATENTS

| | | | |
|---|---|---|---|
| 2,763,114 | 9/1956 | Carruthers | 130/30 R |
| 2,943,629 | 7/1960 | Carruthers | 130/30 R |
| 3,119,395 | 1/1964 | Carruthers | 130/30 R |
| 3,631,863 | 1/1972 | West | 130/30 R |

*Primary Examiner*—Antonio F. Guida
*Attorney, Agent, or Firm*—Newton, Hopkins & Ormsby

[57] ABSTRACT

A crop orienting device is disclosed for orienting a crop being fed through a harvesting stemmer having a plurality of parallel rows of cutting disks adapted to sever stems from the crop upon rotation. The device comprises first support means supporting a first set of laterally spaced elongated crop orienting members with the spacings between adjacent crop orienting members being substantially equal. Second support means support a second set of laterally spaced elongated crop orienting members in juxtaposition with the first set of crop orienting members and with the spacing between adjacent crop orienting members of the second set being substantially equal to the equal spacings between adjacent crop orienting members of the first set. Means are also provided for securing the first and second support means rigidly together in a plurality of relative positions to render the spacing between the juxtaposed first and second sets of crop orienting members adjustable.

11 Claims, 4 Drawing Figures

PATENTED MAY 28 1974 3,812,863

CROP ORIENTING MECHANISM

BACKGROUND OF THE INVENTION

In harvesting certain farm crops, such as peanuts, after the peanuts have been separated from the vines, a length of stem remains attached to many of the peanuts. To remove the unwanted length of stems from the peanuts, the peanuts with stems are conveyed past a series of rotatably operable cutter disks which sever the length of stem from the peanuts as they are moved past the cutting disks.

In the past, as the peanuts are conveyed past the cutting disks, some of the peanuts would become oriented in a transverse alignment relative to the disks which would cause the cutting disks to damage the peanuts. To prevent the peanuts from assuming such transverse alignment a crop orienting attachment was heretofore invented by Applicant which attachment is disclosed in U.S. Pat. No. 3,631,863. This crop orienting attachment is adapted to be operatively associated with a harvester stemmer bed having a series of parallel rows of elongated slots through which rotatable cutting disks project. In one form the crop orienting attachment comprises a set of laterally spaced elongated crop orienting members constructed as an integral unit which unit is secured atop the stemmer bed with the elongated crop orienting members disposed between the rows of cutting disks. So attached to the stemmer bed the crop orienting members inhibit the peanuts from assuming a transverse alignment relative to the cutting disks.

Though the just described attachment has performed its crop orienting function well, it has not been completely satisfactory. Perhaps the foremost problem encountered with its use has been that of maintaining proper lateral spacings between all of the rows of cutting disks and the intersperced crop orienting members. With harvesting stemmers employing large numbers of rows of cutting disks an erroneous difference in lateral spacing between a row of disks and an adjacent crop orienting member is repeated on through the other rows. Where like differences are present they become additive so that a small, quite tolerable difference between two adjacent crop orienting members builds in arithemetic progression on down through the other rows until the erroneous spacing between some rows of disks and adjacent crop orienting members becomes intolerable. Though the attachment disclosed in the aforementioned patent does include means for adjusting the spacings between the cutting disks and crop orienting members such only serves to shift the integral attachment laterally as a whole with respect to the rows of cutting disks. When the aforementioned problem is present such a shifting may merely shift the out of tolerance spacing from one or one group of rows to another.

Other problems encountered by the just described attachment have included the duplication of structural material where crop orienting members overlay the stemmer bed. This duplication renders the combination heavy and produces added expense. In addition, the size of the attachment, which may include some 25 or more laterally spaced crop orienting members, renders manufacture and handling as an integral unit rather difficult.

Accordingly, it is a general object of the present invention to provide an improved crop orienting device for orienting a crop being fed through a harvesting stemmer having a plurality of substantially parallel rows of cutting disks adapted to sever stems from the crop upon rotation.

More particularly, it is an object of the invention to provide a crop orienting device of the type described which may be mounted with improved alignment to a harvesting stemmer comprising a plurality of rows of cutting disks.

Another object of the invention is to provide a crop orienting device which is relative easy to manufacture, handle and mount to a harvesting stemmer comprising a plurality of rows of cutting disks.

SUMMARY OF THE INVENTION

Briefly described, a crop orienting device is provided for orienting a crop being fed through a harvesting stemmer having a plurality of substantially parallel rows of cutting disks adapted to sever stems from the crop upon rotation. In one form of the invention the crop orienting device comprises first support means supporting a first set of laterally spaced elongated crop orienting members with the spacings between adjacent crop orienting members being substantially equal. Second support means support a second set of laterally spaced elongated crop orienting members in juxtaposition with the first set of crop orienting members and with the spacing between adjacent crop orienting members of the second set being substantially equal to the equal spacings between adjacent crop orienting members of the first set. Means are also provided for securing the first and second support means rigidly together in a plurality of relative positions to render the spacing between the juxtaposed first and second sets of crop orienting members adjustable.

DETAILED DESCRIPTION OF THE DRAWING

Figure 1:
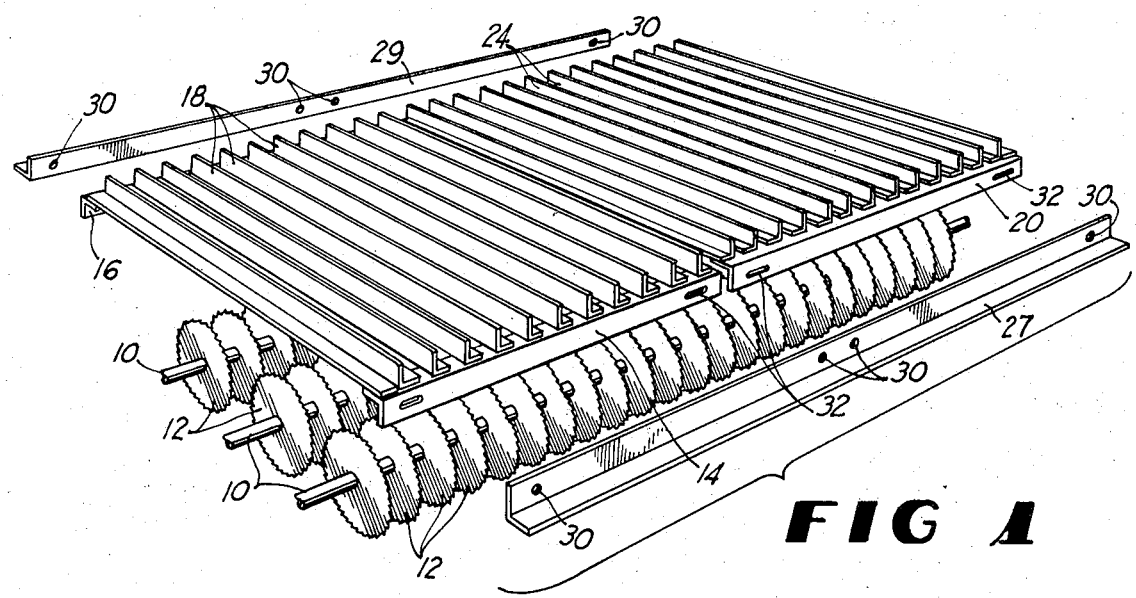
FIG. 1 is an exploded view in perspective of a portion of a harvesting stemmer and a crop orienting device operatively associated therewith embodying principles of the invention in one form.
Figure 2:
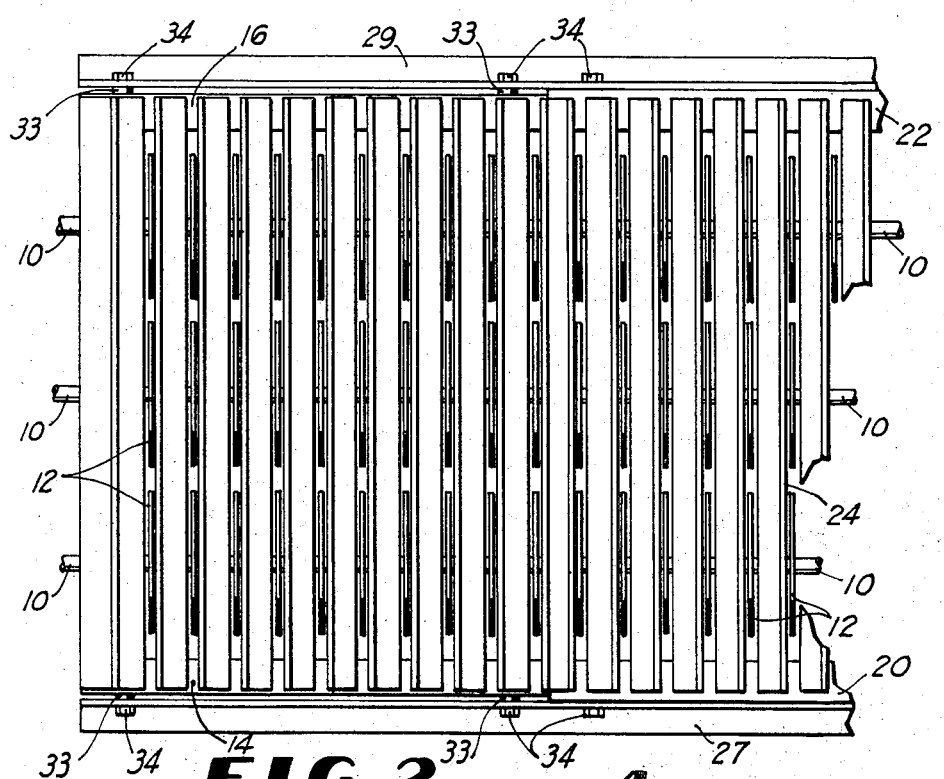
FIG. 2 is a plan view of a portion of the crop orienting device shown in FIG. 1 mounted to the stemmer.
Figures 3, 4:
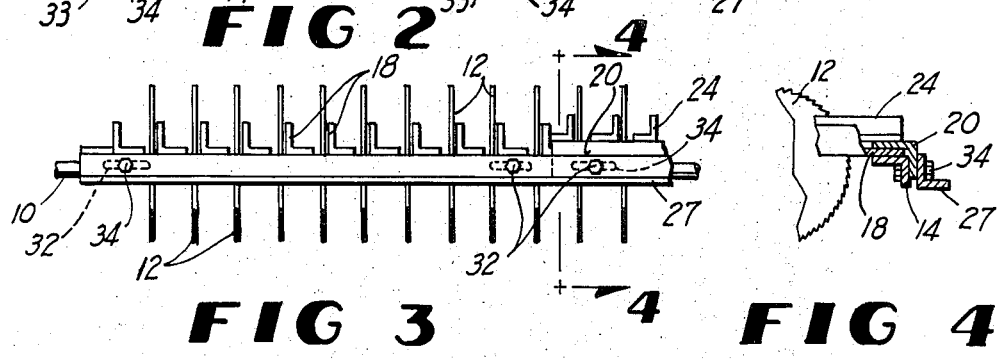
FIG. 3 is a side view in elevation of a portion of the assemblage shown in FIG. 3.
FIG. 4 is a cross-sectional view of the assemblage shown in FIG. 3 taken along plane 4—4.

Referring now in more detail to the drawing, there is illustrated a harvesting stemmer comprising three parallel drive shafts 10 to each of which is secured a set of laterally spaced cutting disks 12. As may best be seen by reference to FIG. 2, the cutting disks 12 are secured to the drive shafts in parallel rows with the lateral spacings between adjacent disks being substantially equal. For operation, the drive shafts are coupled to motive means, not shown, which rotate the shafts and cutting disks to sever stems from a crop such as peanuts.

A crop orienting device is provided for attachment to the stemmer. The crop orienting device comprises two parallel L-shaped cross bars 14 and 16 to the tops of which are secured, as by welding, a set of laterally spaced crop orienting members 18. The crop orienting members, which are spaced apart equal distances, are also L-shaped to provide upstanding parallel member portions which serve to orient the crop and mutually coplanar member portions which provide a bed. Typically, the resulting stemmer bed is supported in an inclined position from front to rear whereby the peanuts being stemmed may be conveyed by gravity past the cutting disks once the crop orienting device is attached to the harvester stemmer.

The crop orienting device comprises another set of parallel L-shaped cross bars 20 and 22 to the tops of which are secured a set of L-shaped laterally spaced crop orienting members 24. Crop orienting members 24 are spaced apart equal distances which distances are substantially the same as the spacings between crop orienting members 18. Dissimilarly, the spacing between cross bars 20 and 22 is slightly greater than that between cross bars 14 and 16.

In securing the two sets of cross bars and the two sets of crop orienting members they support together, an end portion of cross bars 20 and 22 are placed atop a portion of an end crop orienting member 18 secured atop cross bars 14 and 16. This positioning is made possible by the spacing between cross bars 20 and 22 being slightly greater than that between cross bars 14 and 16. An L-shaped brace 27 is then placed in juxtaposition with cross bars 14 and 20 with the brace in abutment with cross bar 20 and spaced from cross bar 14. In similar fashion an L-shaped brace 29 is placed in juxtaposition with cross bars 16 and 22 with the brace in abutment with cross bar 22 and spaced from cross bar 16. This placement aligns annular apertures 30 in the braces with elongated apertures 32 in the cross bars. Fastening means in the form of threaded bolts 34 are then inserted through the aligned apertures and secured with nuts. In securing the fastening means to cross bars 14 and 16 spacers 33 are placed about the exposed bolts between braces and cross bars. The elongated configuration of the apertures in the cross bars provides positional latitude in securing the cross bars to the braces. This positional latitude in turn enables the set of cross bars 14 and 16 to be secured to the set of cross bars 20 and 22 in several relative positions. As a result, the lateral spacing between the two sets of crop orienting members 18 and 24 is rendered adjustable.

It should be understood that the just described embodiment merely illustrates principles of the invention in one form. Many modifications may be made thereto without departure from the spirit and scope of the invention as set forth in the following claims.

I claim:

1. A crop orienting device for orienting a crop being fed through a harvesting stemmer having a plurality of parallel rows of cutting disks adapted to sever stems from the crop upon rotation, said crop orienting device comprising:

first support means supporting a first set of laterally spaced elongated crop orienting members with the spacings between adjacent crop orienting members being substantially equal;

second support means supporting a second set of laterally spaced elongated crop orienting members in juxtaposition with said first set of laterally spaced elongated crop orienting members and with the spacings between adjacent crop orienting members of said second set being substantially equal to said equal spacings between adjacent crop orienting members of said first set; and means for securing said first and second support means rigidly together in a plurality of relative positions to render the spacing between said juxtaposed first and second sets of crop orienting members adjustable.

2. A crop orienting device in accordance with claim 1 wherein said first and second support means each comprise two spaced cross bars to which said first and second sets of elongated crop orienting members are respectively secured.

3. A crop orienting device in accordance with claim 2 wherein said securing means comprises a first brace secured to one of said first support cross bars and to one of said second support cross bars and a second brace secured to another of said first support cross bars and to another of said second support cross bars.

4. A crop orienting device in accordance with claim 1 wherein a portion of a crop orienting member of said second set overlays a portion of a crop orienting member of said first set.

5. A crop orienting device for orienting a crop being fed through a harvesting stemmer having a plurality of parallel rows of cutting disks adapted to sever stems from the crop upon rotation, said crop orienting device comprising:

a first set of L-shaped cross bars spaced apart a first distance and supporting a first set of laterally spaced elongated crop orienting members with the spacing between adjacent crop orienting members being substantially equal;

a second set of L-shaped cross bars spaced apart a distance greater than said first distance and supporting a second set of laterally spaced elongated crop orienting members in juxtaposition with said first set of laterally spaced elongated crop orienting members and with the spacings between adjacent crop orienting members of said second set being substantially equal to said equal spacings between adjacent crop orienting members of said first set; and means for securing said first set of L-shaped cross bars to said second set of L-shaped cross bars in a plurality of relative positions to render the spacing between said juxtaposed first and second sets of crop orienting members adjustable.

6. A crop orienting device in accordance with claim 5 wherein an end portion of said second set of L-shaped cross bars overlays an end portion of said first set of L-shaped cross bars.

7. A crop orienting device in accordance with claim 5 wherein said securing means comprises a first brace secured to a first L-shaped cross bar of said first set of cross bars and to a first L-shaped cross bar of said second set of cross bars, and a second brace secured to a second L-shaped cross bar of said first set of cross bars and to a second L-shaped cross bar of said second set of cross bars.

8. A crop orienting device in accordance with claim 7 wherein said first brace is secured to said first L-shaped cross bar of said first set of cross bars and to said first L-shaped cross bar of said second set of cross bars by means of a plurality of fasteners passing through a plurality of apertures within said first brace and through a plurality of apertures within said first L-shaped cross bars of said first and second sets of cross bars.

9. A crop orienting device in accordance with claim 8 wherein said first brace is in abutment with said first L-shaped cross bar of said second set of cross bars and spaced from said first L-shaped cross bar of said first set of cross bars, and wherein said device further comprises a plurality of spacers disposed between said first brace and said first L-shaped cross bar of said first set of cross bars.

10. A crop orienting device in accordance with claim 5 wherein end portions of said second set of L-shaped cross bars are secured atop a member of said first set of laterally spaced elongated crop orienting members.

11. A crop orienting device in accordance with claim 5 wherein each of said elongated crop orienting members of said first and second sets are L-shaped, and wherein an end portion of said second set of L-shaped cross bars overlays an end portion of said first set of L-shaped cross bars with a portion of an L-shaped elongated crop orienting member of said first set sandwiched therebetween.

* * * * *